Jan. 23, 1968  F. W. SCANN  3,364,709
MACHINE TOOL FOR FABRICATING TUBULAR MEMBERS
Filed Feb. 2, 1965  7 Sheets—Sheet 1

INVENTOR
Frank W. Scann
BY
Delio and Montgomery
ATTORNEYS

INVENTOR
Frank W. Scann

BY Delio and Montgomery
ATTORNEYS

INVENTOR
Frank W. Scann

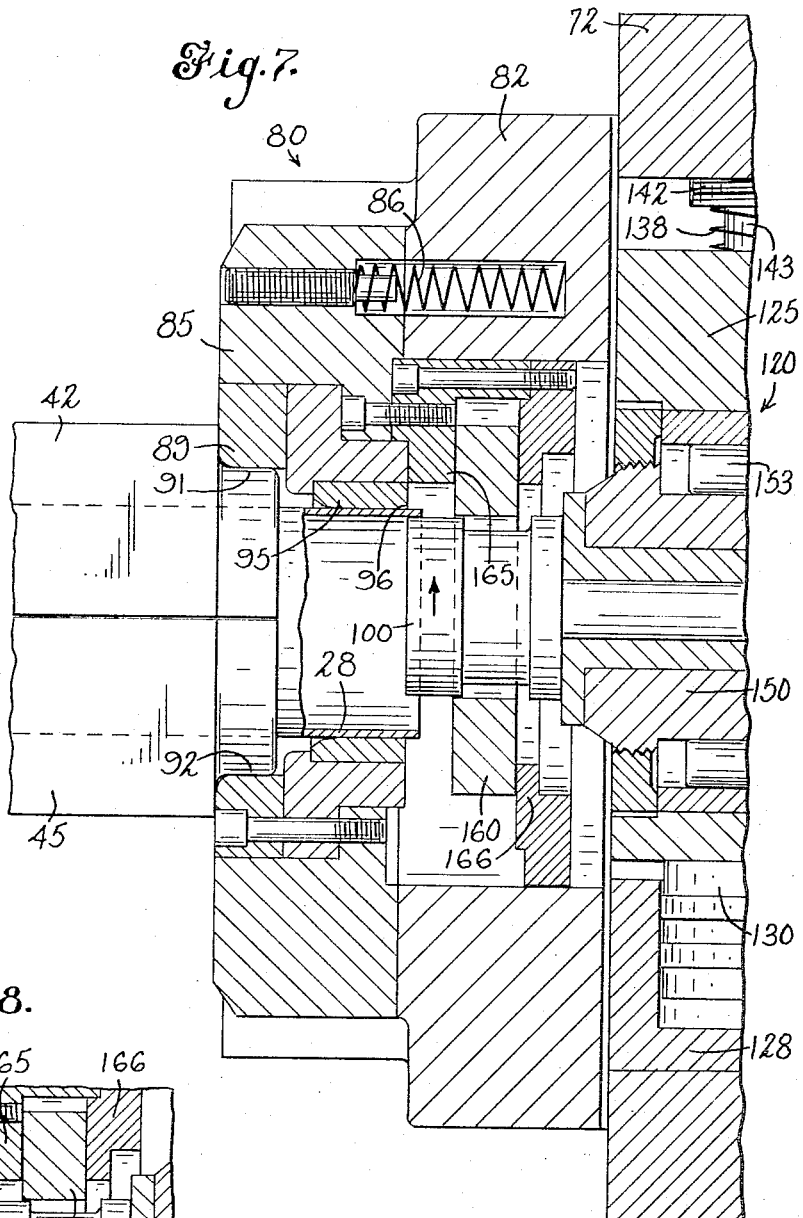
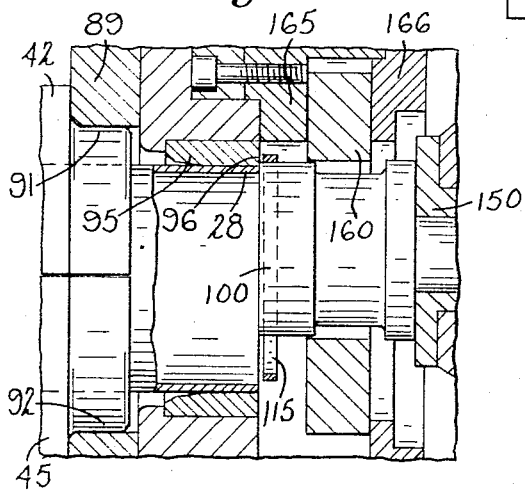

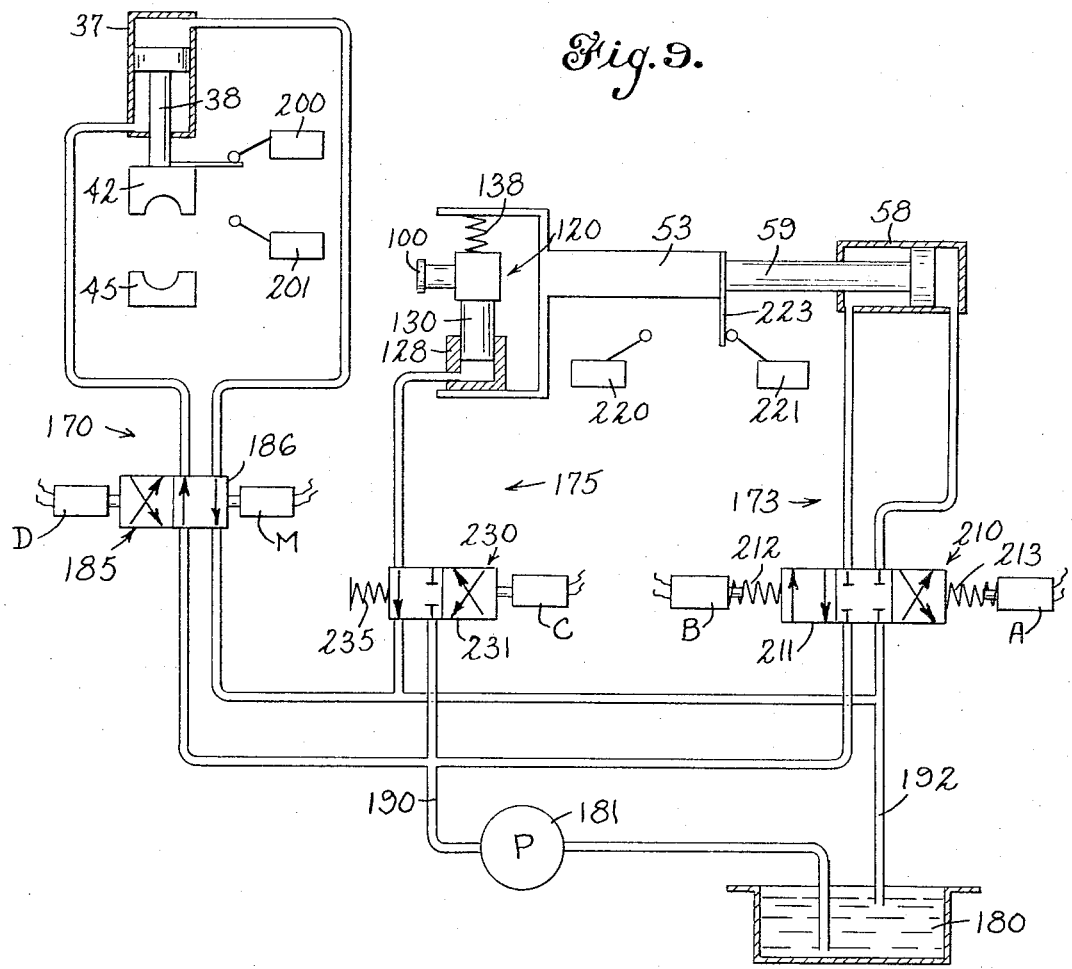
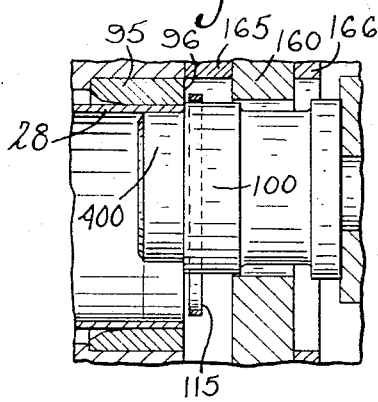
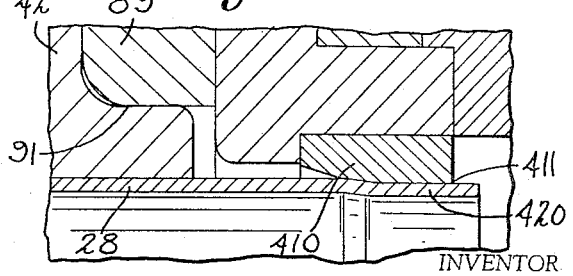

United States Patent Office 3,364,709
Patented Jan. 23, 1968

3,364,709
MACHINE TOOL FOR FABRICATING
TUBULAR MEMBERS
Frank W. Scann, Waterbury, Conn., assignor to The Vaill Engineering Company, Waterbury, Conn., a corporation of Connecticut
Filed Feb. 2, 1965, Ser. No. 429,759
14 Claims. (Cl. 72—71)

ABSTRACT OF THE DISCLOSURE

This invention relates to a trimming machine for use in shaping the end portions of tubular members such as automotive drive shafts and the like. More particularly, this invention is directed to a machine tool for frabricating tubular workpiece ends, comprising in combination a frame including means for clamping a tubular workpiece in place, a ring-like means supported by said frame, said ring-like means having an inner cutting edge, said inner cutting edge positionable to completely surround a portion of the tubular workpiece at a distance from the end of the workpiece, a trimming means supported by said frame, said trimming means insertable into the interior of the end of the workpiece to be fabricated, and means for rotating and radially moving said trimming means against the inside circumference of the workpiece to effect severing of the workpiece between the cutting edge and the trimming means.

---

This invention relates to a machine tool for fabricating tubular members and, more particularly, to a machine tool for shaping the end portions of tubular members.

Users of tubular members or pipes, such as the automobile industry, often require precisely shaped tubular end portions in order that the tubes may be utilized, for example, as parts of automobile drive shafts. Further, the plumbing and automobile industries as well as other users, often require that the ends of tubular members be sized or reduced as well as accurately trimmed or faced, so that they may be utilized in conjunction with other connecting members. Additionally, welded tubular members are often constructed such that they have interior diameter raised weld flash and dimples which must be smoothed, and to reduce the ovality of the inside diameter of the tubular members.

In many of the prior art machines, the outside diameters of tubular members were first sized or reduced at one work station and then transferred to a second work station for a trimming or reducing operation. Further, in order to roll out raised weld flash and dimples in the interior of the tubular members, the trimmed and/or reduced sized tubular members had to be transferred to a third work station. The transferring of the tubular members to different work stations often caused misalignment of the tubular members with respect to the sizing, facing and rolling tools, thereby resulting in inaccuracies in the finished end portions.

Thus, the prior art machines increased the waste and scrap due to the misalignment of the tubular members. Additionally, the multi-station machines of the prior art, due to their physical size, required large areas of floor space and separate operators for each work station. This has resulted in higher operating and plant capital investment costs, thereby increasing the overall costs of fabricating each tubular member.

Accordingly, a new machine was necessary to effect the shaping of tubular members at a single work station. Further, a single work station precision machine was required to precisely and accurately trim a tubular member, or trim and reduce or size the outside diameter of a tubular member, or trim, reduce or size the outside diameter of a tubular member and to simultaneously roll the interior diameter of a tubular member. Therefore, to meet the requirements of industry, applicant has invented a new and improved machine tool for accurately and precisely trimming and/or reducing or sizing, and/or rolling end portions of tubular members at a single work station.

In view of the foregoing, it is an object of this invention to provide a new and improved machine for fabricating and shaping tubular members.

Another object of this invention is to provide a new and improved invention for accurately severing the end portions of a tubular member.

Another object of this invention is to provide a new and improved machine tool for automatically trimming and reducing or sizing the outside diameter of a tubular member at a single work station.

A further object of this invention is to provide a new and improved machine tool for automatically trimming and reducing or sizing tubular members, and rolling the inside diameter of the tubular member end portions.

Still other objects and advantages of this invention will in part be obvious and will in part be apparent from the specification.

In accordance with this invention, a machine tool is provided which includes means for accurately trimming the end portions of tubular members. In the preferred embodiment of this invention, means are provided for clamping a tubular member and means responsive to the clamping of the tubular member are provided for sizing the outside diameter and trimming the end portion of a tubular member at a single work station. Further, in alternate embodiments, means are provided for reducing the outside diameter of a tubular member and rolling the interior diameter of a tubular member and portion.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in conjunction with the accompanying drawings, in which:

FIG. 7 is an enlarged sectional view of a portion of FIG. 4 with the operating machine tool parts located in another position;

FIG. 8 is an enlarged sectional view of a portion of FIG. 4 showing the operating parts in still another position.

FIG. 9 is a diagrammatic representation of a hydraulic system suitable for use in the machine according to this invention;

FIG. 11 is an alternate embodiment of the combination of a trimming and rolling member according to this invention; and FIG. 12 is an alternate embodiment of the combination of a reducing die and a trimming and rolling member according to this invention.

Figure 1:
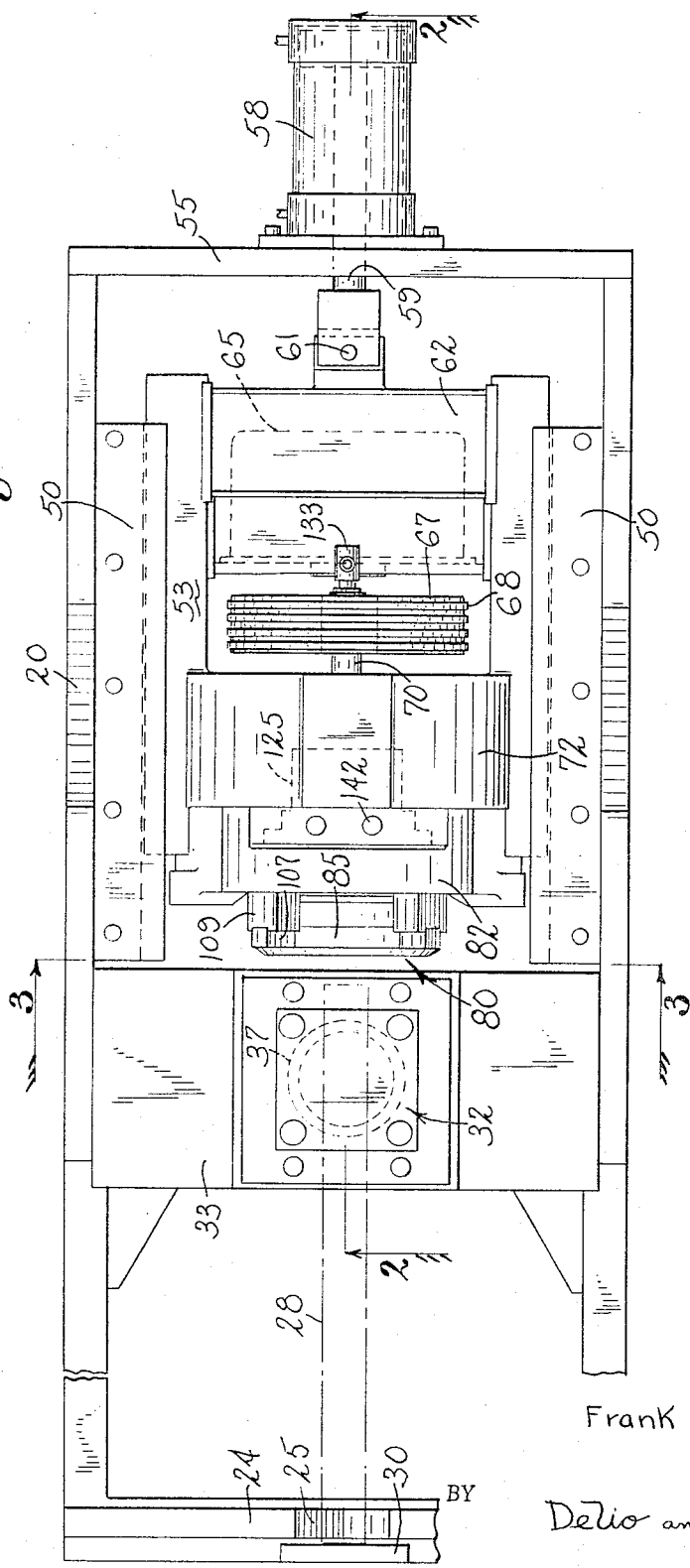
FIG. 1 is a top plan view of a machine according to this invention.
Figure 2:
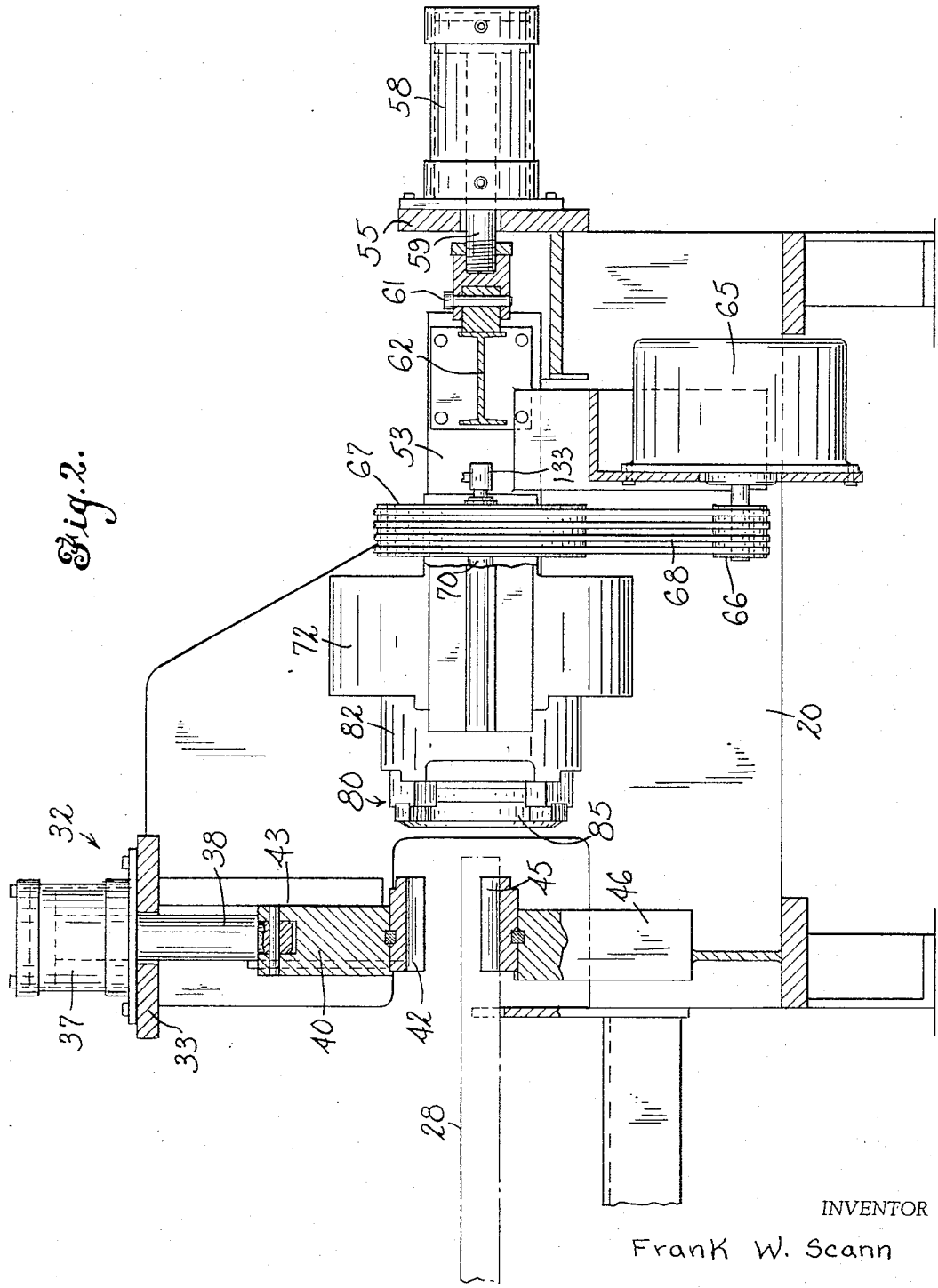
FIG. 2 is a sectional view taken substantially along line 2—2 of FIG. 1.

Referring now to FIGS. 1 and 2, there is shown a main frame 20 of the machine according to this invention. Positioned on the left side of frame 20 is a tubular member supporting plate 24 having a V cut 25 therein for horizontally positioning and supporting a tubular member or tube 28. Also coupled to frame 20 is a gaging plate 30 for horizontally positioning the tubular member 28 with respect to the operating parts of the machine.

Positioned on the main frame 20 at a distance removed from the gaging plate 30, is a tubular clamping mechanism generally shown at 32. The mechanism 32 includes supporting member 33 which is connected to main frame 20. The supporting member 33 provides a support for a preferably hydraulically actuated clamp cylinder 37 which is affixed thereto. The cylinder 37 has a movable piston rod 38 which is slidable upwardly and downwardly through an opening in supporting member 33. The rod 38 is coupled to a clamp slide 40 which, in turn, is coupled to an upper tubular clamping jaw 42. The slide 40 is slidable in vertical ways 43 mounted on member 33. Positioned below jaw 42 is a lower clamping jaw 45 supported by a supporting member 46 coupled to main frame 20. Upon actuation of piston 38, the upper jaw 42 engages tubular member 28 and clamps it against lower jaw 45, thereby firmly securing tubular member 28 in the machine.

Positioned adjacent to the clamping mechanism 32 is a plurality of ways 50 coupled to the main frame 20 for slidably guiding a movable frame 53 within the main frame 20. Mounted on the right side of the main frame 20 is an end plate 55. Supported by end plate 55 is a cylinder 58, preferably of the hydraulic type, having a piston rod 59 which extends through an opening in plate 55. The rod 59 is pivotally connected by a pivot pin 61 to a flanged plate 62 which is mounted on the movable frame 53. Thus, the movement of piston rod 59 toward the left of FIG. 1 causes the slidable and movable frame 53 to move in a direction toward the clamped tubular member 28.

Referring now to FIGS. 1–4, there is shown a motor 65 supported by frame 53. The shaft of motor 65 is coupled by way of sheaves 66 and 67 and a belting 68 which is coupled between the sheaves to drive a shaft 70. Since the diameter of sheave 67 is greater than the diameter of sheave 66, sheave 67 and shaft 70 will rotate at a speed less than the speed of the shaft of motor 65.

Also mounted on frame 53 is an outer housing 72 which rotatably supports an inner housing 73. The housing 73 is free to rotate on the bearing assembly 75 positioned between the two housings. The shaft 70 is coupled to the inner housing 73 to provide the torque to rotate housing 73 in housing 72. This is more particularly shown in FIG. 4.

Figure 3:
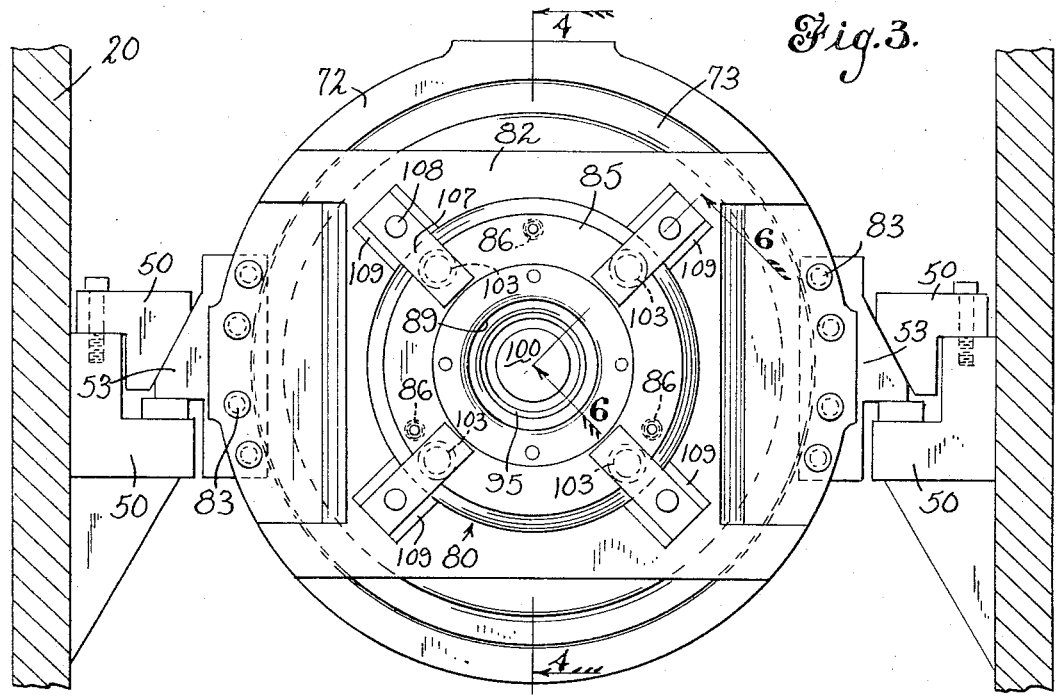
FIG. 3 is a sectional view taken along line 3—3 of FIG. 1.
Figure 4:
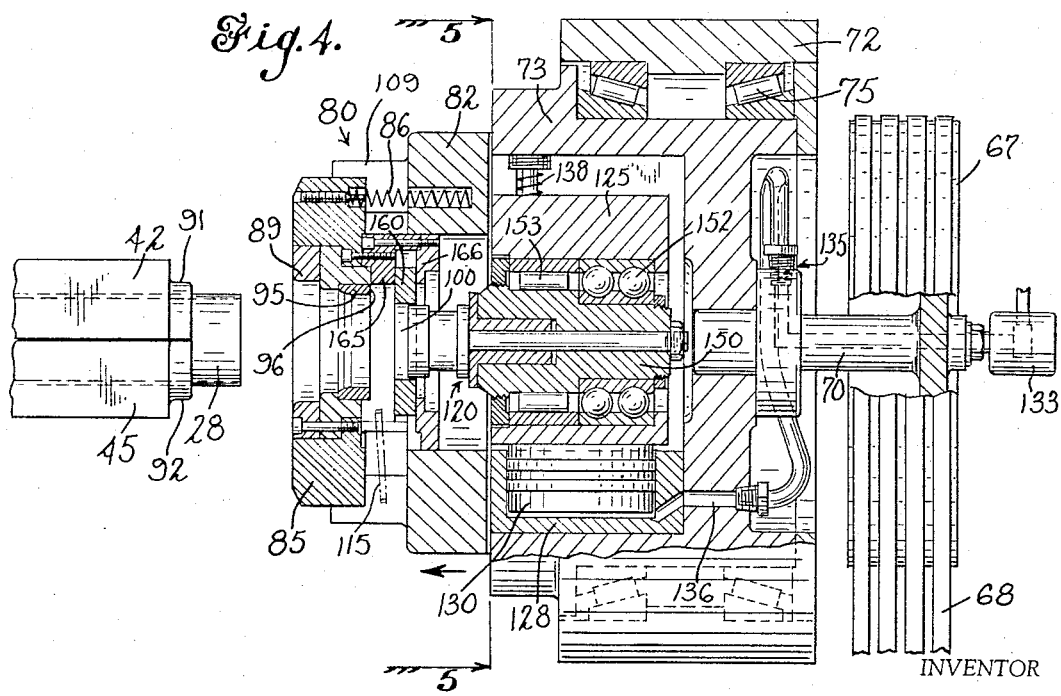
FIG. 4 is a sectional view taken along line 4—4 of FIG. 3.
Figure 5:
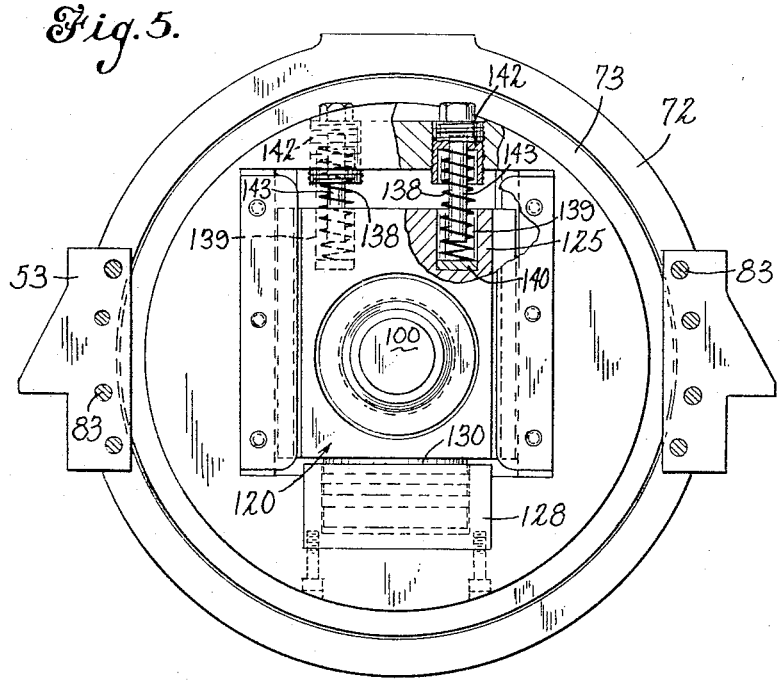
FIG. 5 is a sectional view taken along line 5—5 of FIG. 4.
Figure 6:
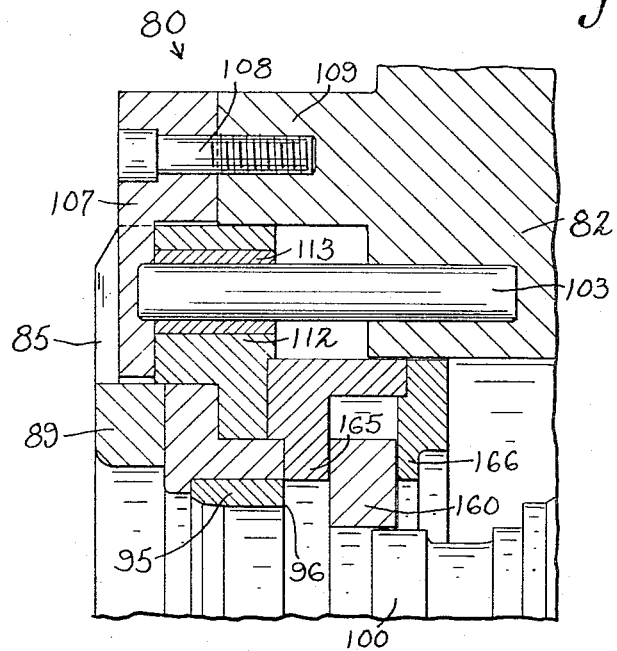
FIG. 6 is a sectional view taken along line 6—6 of FIG. 3.

Referring more particularly now to FIGS. 3, 4 and 6, there is generally shown a tubular die holding mechanism 80 for overlying the end of the tubular member 28. The mechanism 80 provides a portion of the cutting edge to effect a severing or trimming of the tubular member as well as providing means for firmly holding the end to be trimmed in place as well as means for aligning the remaining trimming portion of the machine with respect to tubular member 28. In the preferred embodiment, shown in FIGS. 1–8, the holding mechanism 80 is constructed such that it not only holds the tubular member 28, but also acts as an outside diameter sizing die for the end portion of the tubular member to be trimmed.

The tubular member die holding mechanism 80 comprises a non-rotating end plate 82 which is fastened at 83 to the outer housing 72. Coupled to and supported by end plate 82 is a front die assembly 85 which is resiliently biased away from end plate 82 by a plurality of springs 86. The front die assembly 85 includes a die alignment portion 89 which is positioned such that it will align and mate with the upper and lower jaw clamp portions 91 and 92 respectively, both of which are more particularly shown in the left side of FIG. 4, when the slidable frame is forced forward by piston rod 59.

The front die assembly 85 also includes a sizing die 95 for overlying and sizing or smoothing the end portion of the tubular member 28 to be trimmed. The sizing die is used to decrease ovality of the outside diameter of the tubular member. Additionally, the sizing die 95 includes a rear cutting edge 96 which coacts with a moving trimming member 100 to effect a trimming or severing of the end portion of tubular member 28. The front die assembly 85 is guided for forward and rearward movement by a plurality of guide pins 103 which are mounted at one end in the front end plate 82 and held at their other end by a plurality of retaining plates 107. The plates 107 are connected by a plurality of screws 108 to a plurality of lugs 109 which extend outwardly from the front end plate 82. The resiliently biased front die assembly 85 is slidably coupled to guide pins 103 by a member 112 having a bushing 113. The front end assembly 85 is resiliently biased in a forward direction to permit a tubular member remnant 115 to drop from an opening between the front die assembly 85 and front end plate 82 upon withdrawal of trimming member 100.

Reference is now made to FIGS. 4, 5, 7 and 8 in particular, for a description of the mechanism for effecting trimming of an end portion of tubular member 28 in cooperation with the die cutting edge 96. As previously disclosed, the rotating shaft 70 is coupled to a rotatably mounted inner housing 73. Positioned in the interior of the housing 73 is a rotating cutter assembly 120 which includes a vertically slidable inner housing 125 guided in the cutter assembly 120 by guide ways 126. This is mounted on front of cutter assembly 120 as more clearly shown in FIG. 5. The vertically slidable inner housing assembly 120 is vertically lifted by a cylinder 128, preferably of the hydraulic type, having a piston 130. Cylinder 128 and piston 130 are both supported within the rotating inner housing 73. Hydraulic fluid to affect movement of piston 130 is directed into cylinder 128 by a hydraulic rotary seal 133 which is coupled to both a source of fluid and to the shaft 70. The hydraulic fluid passes through an axial opening in shaft 70 to a hydraulic fluid coupling pipe assembly 135. The hydraulic fluid then passes through a duct 136 in inner housing 73 and into cylinder 128.

The slidable assembly 120 is resiliently biased against piston 130 by springs 138 which extend into bores 139 in the slidable assembly 120. The bores 139 are provided with plates 140 which engage one end of springs 138. The other ends of springs 138 held in place by threaded counterbored spring retaining members 142 which threadedly engage inner housing 73 and are adjustable therein. Positioned in the counterbore of members 142 are pins 143 for limiting the movement of the slidable assembly 120. The pins 143 stop the outward movement of the assembly by engaging the plates 140 positioned in the bores 139. By turning threaded members 142, pins 143 can be adjustably set to limit the movement of slidable assembly 120. Positioned and supported in the interior of the slidable assembly 120 is another rotatable member 150, to which there is affixed trimming member 100. The rotatable member 150 is free to rotate on bearings 152 and 153 positioned between it and the assembly 120.

Briefly, to trim the end portion of a tubular member, the clamping jaws 42 and 45 are first closed and then the die holding mechanism 80 is brought forward to hold and overlie the tubular member. The movement of the die assembly also brings the trimming member 100 forward at the same time, such that it penetrates into the interior of the tubular member 28. The trimming member 100 is then eccentrically raised with respect to the axis of rotating housing 73 into contact with tubular member 28 to effect a cutting of the tubular member end portion by the action of eccentrically rotating trim member 100. This position of the clamp jaws, the holding die and the trimming member during the trimming operation, are clearly shown in FIG. 7. In FIG. 8, there is shown the position of the trimming member 100 after a remnant 115 has been severed from tubular member 28 by the action of the die edge 96 and trimming member 100.

Referring now in particular to FIGS. 4, 6, 7 and 8, there is shown positioned adjacent to the trimming member 100, a floating remnant ejecting ring 160 which is vertically movable in movable die assembly 85. The ring 160 is horizontally held in place by plates 165 and 166 which are mounted in die assembly 85. Ring 160 is permitted to float so that it will move with the trimming member 100 when the slidable housing 125 is lifted by piston 130. The ring 160 will engage the trimmed remnant 115 cut by the action of trimming member 100 and the die edge 96, after the withdrawal of the trimming member 100 and die mechanism 80. Ejection of the remnant machine is brought about through the opening between the die assembly 85 and plate 82 due to the action of the springs 86 separating these parts. This is shown more clearly in FIG. 4.

In FIG. 9, there is disclosed a suitable hydraulic system generally shown at 170 for moving the upper clamp jaw 42 to clamp tubular member 28 against the lower clamp jaw 45. Also shown in FIG. 9 is a hydraulic system generally shown at 173 for moving the sizing die 95 and the trimming member 100 toward and away from the clamped tubular member 28. FIG. 9 further discloses a hydraulic system, generally shown at 175, for raising the trimming member 100 against the interior of the clamped tubular member 28. In order to furnish hydraulic fluid to the above-mentioned hydraulic systems, a conventional fluid reservoir 180, having hydraulic fluid therein and coupled to a fluid pump 181, is provided.

The hydraulic system, generally shown at 170, includes a two-position valve 185 having a movable magnetic responsive spool 186. The location of spool 186 is controlled by valve solenoids D and M. When a signal is applied to solenoid D, the left side of spool 186 will be positioned with respect to a fluid inlet tube 190 and a fluid outlet tube 192 to cause clamp 42 to be lowered. To accomplish this, fluid enters the top of cylinder 37 and forces piston rod 38 downward while, at the same time, fluid is permitted to exit from the lower portion of cylinder 37 and enter the outlet tube 192. To lift the upper clamp jaw 42, the solenoid D is deenergized and solenoid M is energized. Positioned in proximity to the upper clamp jaw 42 and mounted on the clamping mechanism 32, are two limit switches 200 and 201, utilized to detect the upper and lower positions of the clamp jaw 42 to actuate the machine's automatic electrical control circuitry.

The hydraulic system generally shown at 173 includes a three-position valve 210 with a movable magnetic responsive spool 211. The spool 211 is biased by springs 212 and 213 and its position is controlled by solenoids A and B. When neither solenoid A nor B is energized, springs 212 and 213 will position spool 211 as shown in the figure. Fluid will be prevented from entering or leaving cylinder 58. When solenoid A is energized, spool 211 will move toward the left to permit fluid to enter from inlet tube 190 into the right side of cylinder 58, thereby forcing piston 59 to the left. Simultaneously, fluid wil be exiting from the left side of cylinder 58 into outlet tube 192. When solenoid B is energized and solenoid A is de-energized, spool 211 will be positioned such that fluid will enter cylinder 58 and move the piston rod 59 toward the right. In this manner, the slidable frame 53 carrying die 95 and the trimming member 100, is positioned with respect to the clamped tubular member 28. Positioned alongside the slidable frame 53 and mounted on main frame 20 is a pair of limit switches 220 and 221 which are actuated by a flange 223 extending from the slidable frame 53. The limit switches 220 and 221 are used to detect the forward and rearward positions of slidable frame 53 to provide control signals for automatically actuating the remainder of the control circuitry of the machine.

The hydraulic system, generally shown at 175, includes a two-position valve 230 with a movable magnetically actuated spool 231. The spool 231 is resiliently biased toward the right by a spring 235 and is movable toward the left in response to the energization of a solenoid C. When solenoid C is de-energized, fluid from cylinder 128 will be permitted to exit into outlet tube 192. Upon energization of solenoid C, spool 231 will move toward the right and permit fluid to enter cylinder 128 from inlet tube 190 to raise the piston 130 and trimming member 100.

Figure 10:
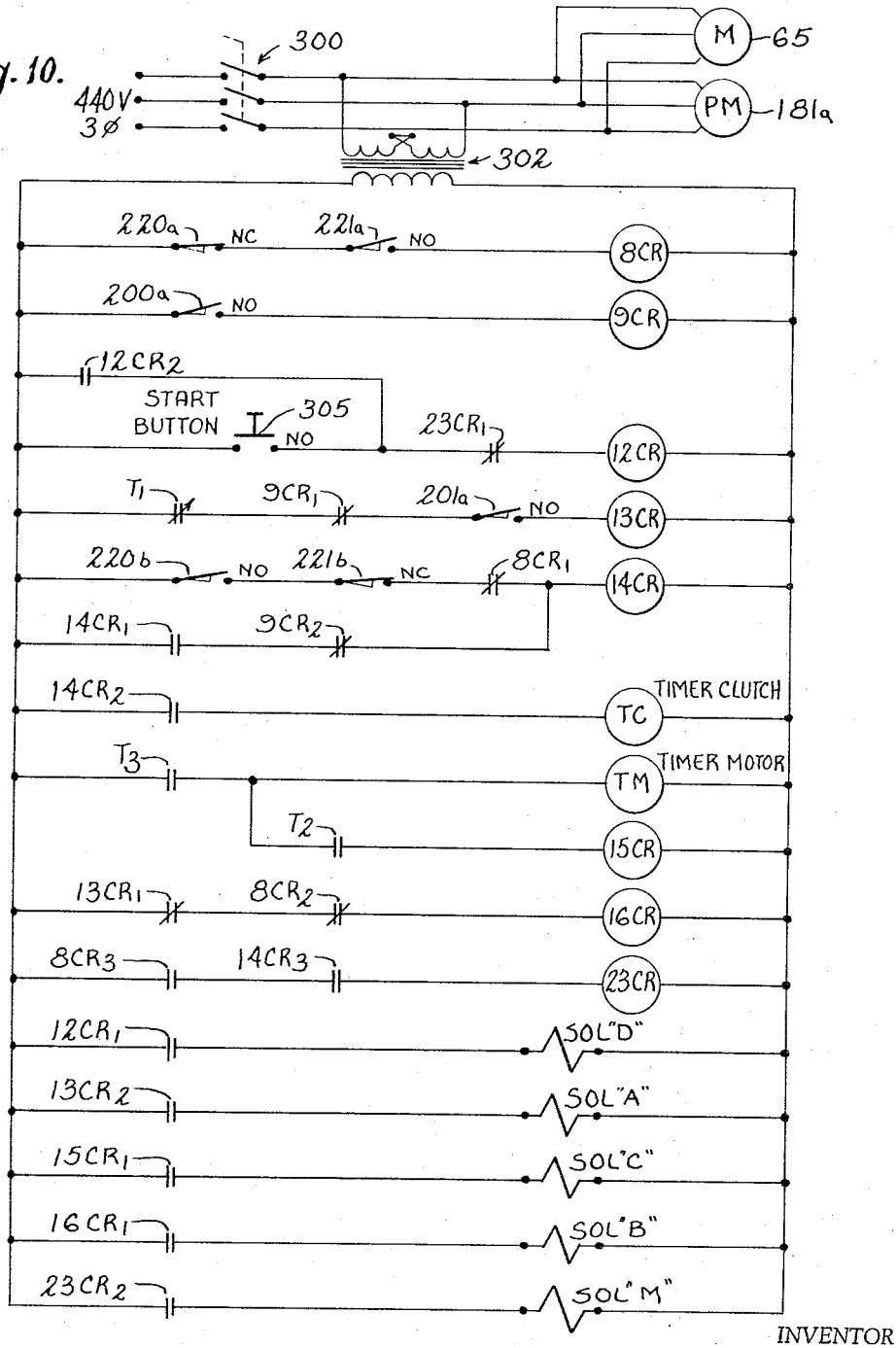
FIG. 10 is a schematic wiring diagram of a control system suitable for use in the machine shown in FIGS. 1–9.

Referring now to FIG. 10, there is shown an electrical control system for automatically controlling the operation for the machine tool for fabricating tubular members according to this invention. The control system comprises a switch 300 for applying power to the motor 65 and a pump motor 181a. A transformer 302 is coupled across two of the three lines to provide alternating current to the control circuit of the control system. Connected as disclosed in the circuit drawing, are A.C. relay coils shown as circles, 8CR, 9CR, 12CR, 13CR, 14CR, 15CR and 23CR, and relay contacts corresponding to the above nomenclature, and which are shown as a pair of parallel lines with or without a slash line therethrough. A pair of parallel lines represents a normally open relay contact and each pair of parallel lines with a slash line therethrough represents a normally closed relay contact. Additionally shown in the circuit are the multiple contact limit switches 200, 201, 220 and 221, which are connected in the circuit to automatically indicate the movement of certain parts of the machine by closing certain relay contacts and energizing selective valve solenoids. Further connected in the control circuitry are a timer clutch, labeled Tc, and a timer motor, labeled Tm, for controlling timer relay contacts $T_1$, $T_2$ and $T_3$. The timer motor provides a predetermined time length signal upon actuation, to control the length of time the trimming member 100 is held in contact with tubular member 28. A suitable timer motor and clutch assembly may be purchased from the Eagle Signal Company of Moline, Ill., Model "Cycl-Flex" HP 515, 10 secs. Also coupled in the circuit are solenoids A, B, C, D and M, for controlling the various hydraulic valves in the machine.

Reference is now made to FIGS. 1–10 for a description of the overall operation of the machine tool and its hydraulic systems and automatic electrical control circuitry according to this invention. Before initiating the operation of the machine, a tubular member 28 to be trimmed and sized is placed upon the V cut support 25 and the lower clamp jaw 45. This is more clearly shown in FIG. 1. The switch 300, FIG. 10, is then closed to supply power to motor 65 to cause the inner housing 73 to begin rotating and start pump motor 181a. Further power is supplied through transformer 302 to the control circuitry of the machine. A normally open pushbutton start switch 305 is then depressed to start the operation of the moving parts of the machine. Closure of switch 305 energizes relay 12CR through normally closed relay contacts 23CR$_1$, thereby closing normally open relay contact 12CR$_2$ to keep the circuit energized and further closes normally open relay contact 12CR$_1$. This energizes solenoid D and moves valve spool 186 to the left, thereby forcing hydraulic fluid into cylinder 37 in a direction to bring upper clamp 42 down upon tubular member 28. As upper clamp 42 moves downwardly, normally open limit switch 200a (which was held closed by the raised position of clamp 42) is permitted to open. This closes normally closed relay contact 9CR in circuit with normally closed timer contact T$_1$, normally open limit switch 201a, and relay coil 13CR. When the upper clamp jaw 42 reaches its extended downward position, normally open limit switch 201a is closed by a flange coupled to jaw 42. The closure of limit switch 201a energizes relay coil 13CR and closes normally open contacts 13CR$_2$ which is in circuit with solenoid A. The energization of solenoid A moves valve spool 211 to the left, thereby forcing fluid into cylinder 58 to move the piston rod 59 toward the left side (FIG. 9). Since rod 59 is coupled to slidable housing 53 upon which there is mounted the trimming member 100 and the sizing die 95, the sizing die 95 will be forced over the end portion of tubular member 28 and the trimming member 100 will be inserted into the interior of tubular member 28. This position of the trimming member 100 and sizing die 95 is shown in FIG. 7, just before the trimming member 100 begins to cut into tubular member 28. It is to be noted that before die 95 begins to overlie tubular member 28, the die alignment mechanism 89 mates with clamp jaw portions 91 and 92 to align both die 95 and trimming member 100 with tubular member 28 and clamps 42 and 45. As the die 95 begins to be forced over tubular member 28, the front die assembly 80 is compressed back until it is stopped by end plate 82. At this time, die 95 and its cutting edge 96 are in the proper location to cooperate with trimming member 100 to sever tubular member 28. The movement of frame flange 223 toward the left opens normally closed limit switch contact 220a to de-energize relay coil 8CR and close relay contact 8CR$_1$ The forward movement of frame flange 223 also permits normally closed (but previously held open) limit switch contact 221b to close and also closes normally open limit switch contact 220b. The combination of these occurrences energizes relay coil 14CR and closes relay contacts 14CR$_1$ and 14CR$_2$. Normally closed relay contact 9CR$_1$ is already closed due to the normally open position of limit switch 200a. When relay contact 14CR$_2$ closes, the timer coil Tc is energized to start timer motor Tm. The starting of motor Tm closes timer motor contacts T$_2$ and T$_3$, thus energizing relay coil 15CR and closing relay contact 15CR$_1$. This energizes valve solenoid C and moves valve spool 231 toward the left, FIG. 9, to permit fluid to enter piston 128 and drive the trimming member off-center from the axis of the rotating inner housing 73. This causes the timed trimming cycle to be initiated to sever the tubular member between the die edge 96 and trimming member 100. During the trimming operation, the trimmer member 100 acts as a rotating eccentric cutter, due to the friction between it and the inner surface of tubular member 28. The position of the trimming member 100 during the cutting or trimming operation is clearly shown in FIGS. 7 and 8.

After a predetermined period of time, the preset timer motor Tm cuts off, thereby completing the cutting cycle. This opens timer contacts T$_1$, T$_2$ and T$_3$, thereby de-energizing relay coils 13CR and 15CR, opening relay contacts 13CR$_2$ and 15CR$_1$. This, in turn, de-energizes solenoids A and C and returns valve spools 211 and 231 to the position shown in FIG. 9. The return of valve spool 231 bleeds the fluid from piston 130, thereby permitting resiliently biased slidable inner housing 125 to return to its normal position carrying trimming member 100 with it. Further, normally closed relay contact 13CR which was previously held open, is permitted to close. Since normally closed relay contact 8CR$_2$ is already closed due to the position of limit switches 220a and 221a, relay coil 16CR is energized, thereby closing relay contacts 16CR$_1$, thus energizing solenoid B. The energizing of solenoid B positions the valve spool 211 in position to permit fluid to enter cylinder 58 and return the slidable frame 53 to the right side of FIG. 9. The return of the frame carries the trimming member 100 and the sizing die with it. As the die begins to move to the right, the front die assembly 85 separates from the die end plate 82 while, at the same time, the trimming member 100 carrying the remnant 115 is being withdrawn. Due to the action of the floating ejecting ring 160, the remnant 115 is forced off trimming member 100 and ejected from the machine. This is clearly shown in FIG. 4.

Following the above, the movement of frame flange 223 closes limit switch contact 221a and permits limit switch contact 220a to normally close, thereby energizing relay coil 8CR and closing relay contact 8CR$_3$. Since relay contacts 14CR$_3$ are already closed and 14CR remains energized because 9CR$_2$ is normally closed, relay coil 23CR will be energized. The energizing of 23CR opens normally closed relay contact 23CR$_1$, thereby de-energizing valve solenoid D and de-energizing relay coil 12CR, thus opening relay contacts 12CR$_1$ and 12CR$_2$. At the same time, the energizing of coil 23CR closes contact 23CR$_2$, thus energizing solenoid M and raising clamp jaw 42. The raising of clamp jaw 42 opens limit switch contact 201a. Further, limit switch contact 200a is closed, energizing coil 9CR and opening contacts 9CR$_2$, then dropping out contacts 14CR$_1$ and 14CR$_3$. Additionally, contact T$_1$ resets itself due to the opening of contact 14CR$_2$. This completes the general description of the operation of the machine tool of this invention.

Referring now to FIG. 11, there is shown, in an alternate embodiment, a trimming member 100 which has mounted on its working end, a rolling member 400 utilized to simultaneously roll out flash weld and dimples or raised portions in the interior of tubular member 28 while, at the same time, member 100 is cutting through the tubular member. The flash welds are rolled in this manner to decrease their prominence and to decrease the ovality of inner diameter of the trimmed tubular member 28. Thus, with the combination of the sizing die 95 and the rolling member 400, both of which decrease the ovality of the trimmed tubular member, an improved end product is provided which is particularly suitable for mating with other tubular members.

Referring now to FIG. 12, there is shown in an alternate embodiment, a reducing die 410 having a trimming edge 411 in place of the sizing die 95 shown in the preferred embodiment. The reducing die 410 is of a diameter smaller than the diameter of tubular member 28. Thus, by utilizing a reducing die in combination with trimming member 100 or with the combined trimming and rolling members, tubular member 28 having a trimmed, or trimmed and rolled reduced end portion 420, may be provided without the necessity for transferring the work to another work station.

It is to be understood that the embodiments shown herein are only illustrative. For example, a pneumatic system or other systems could be utilized in place of the hydraulic system shown, without departing from the spirit and scope of this invention.

It will thus be seen that the objects set forth above, among those made apparent from the preceding description, are efficiently attained and, since certain changes may be made in the foregoing constructions without departing from the spirit and scope of the invention, it is intended that all matter contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A machine tool for fabricating tubular workpiece ends, comprising in combination, a frame including means for clamping a tubular workpiece in place, a ring-like means supported by said frame, said ring-like means having a first stationary portion and a second movable portion resiliently biased away from said first portion, said second portion having means at one end thereof for receiving a workpiece end and an inner cutting edge means at the opposite end thereof to completely surround a portion of the tubular workpiece at a distance from the end of the workpiece, a trimming means supported by said frame, said trimming means insertable into the interior of the end of the workpiece to be fabricated, and means for rotating and radially moving said trimming means against the inside circumference of the workpiece to effect a severing of the workpiece between the cutting edge and the trimming means.

2. Apparatus for fabricating a tubular member comprising in combination, a frame, clamping means mounted on said frame for clamping a tubular member in place, holding means positioned on said frame for holding one end of the tubular member to be fabricated, said last means including a cutting edge which extends around the outside diameter of the tubular member, trimming means mounted on said frame and insertable in the interior of said tubular member for trimming the end portion of the tubular member to be fabricated in cooperation with said cutting edge of the holding means, and a remnant ejecting ring positioned about said trimming means for ejecting the trimmed remnant from the workpiece when the trimming means is withdrawn from the interior of the tubular member after the trimming operation is completed.

3. Apparatus in accordance with claim 2, wherein said holding means includes a sizing die which includes said cutting edge.

4. Apparatus in accordance with claim 2, wherein said holding means includes a reducing die which includes said cutting edge.

5. A machine tool for fabricating tubular workpiece ends comprising in combination, a frame including means for clamping a tubular workpiece, a die supported by said frame, said die having a rearwardly positioned inner severing edge, said severing edge positionable to completely surround a portion of the tubular workpiece at a distance from the end of the workpiece, and a trimming member supported by said frame, said trimming member insertable into the interior of the end of the workpiece, and means for moving said trimming member in a direction to cooperate with said severing edge to effect a trimming of the tubular workpiece end, wherein said clamping means includes shoulder alignment means and wherein said die means includes die alignment means positionable to mate with the alignment means of said clamping means, thereby aligning the severing edge with respect to the tubular workpiece.

6. A machine tool in accordance with claim 5, wherein said die is a sizing die which provides a means for insuring the outside ovality of a portion of the tubular workpiece end.

7. A machine tool in accordance with claim 5, wherein said die is a reducing die which provides a means for reducing an end portion of the tubular workpiece.

8. A machine tool in accordance with claim 5, wherein said die includes an ejecting ring which cooperates with said trimming member to eject a severed workpiece end from the machine tool.

9. Apparatus for fabricating the ends of tubular workpieces comprising in combination, a first frame means, clamping means mounted on said frame, means for supporting the workpiece intermediate its ends, a second frame mounted on said first frame means and movable toward and away from an end of the tubular member, a first member having an inner cutting edge, said first member mounted on said second frame means, and said inner cutting edge positionable to surround a portion of the tubular workpiece at a distance from an end of the workpiece, a housing mounted on said second frame means and rotatable thereon, trimming means extending from and rotatably supported within said housing, said trimming means positioned to be insertable into an end of the tubular workpiece, and said trimming means supported within said housing such that it is movable within said housing substantially perpendicular to the axis of rotation of said housing, said trimming means further cooperating with said cutting edge to sever a portion of the end of the tubular workpiece, wherein said first member includes front and rear portions, said front portion resiliently biased away from said rear portion and said rear portion including said cutting edge and an ejecting member supported by said trimming means and floatably guided within said first member, said trimming means, said ejecting member and said first member cooperating to eject, after the severing of an end portion, a trimmed workpiece remnant between said front and rear portions upon withdrawal of the first member and the trimming means from the tubular workpiece.

10. A machine tool for fabricating tubular workpiece ends comprising in combination, a frame, clamping means mounted on said frame for supporting a tubular workpiece, a first means supported by said frame, said first means having an inner cutting edge, said inner cutting edge positionable to completely surround a portion of the tubular workpiece at a distance from the end of the workpiece, trimming means supported by said frame, said trimming means insertable into the interior of the end of the workpiece to be fabricated, said trimming means coacting with said cutting edge to sever a portion of the tubular workpiece, and means responsive to the position of the clamping means to simultaneously position said cutting edge around said workpiece and to simultaneously insert said trimming means into the interior of the workpiece.

11. A machine tool in accordance with claim 10, including means for positioning said trimming means in contact with the interior of the tubular workpiece in response to the position of the trimming means.

12. A machine tool in accordance with claim 11, wherein said means for positioning includes timing means for setting the length of time that said trimming means is positioned in contact with the interior of the workpiece.

13. Apparatus for fabricating tubular workpiece ends comprising in combination, a first means for clamping the tubular workpiece intermediate its ends, a movable frame having mounted thereon a die with a cutting edge for surrounding a portion of the end of the tubular workpiece at a distance from an end of the workpiece, said frame also having mounted thereon a rotatable housing, said housing rotatably supporting a trimming means extending therefrom, said trimming means being insertable into the interior of an end of the tubular workpiece, means for rotating said housing, means responsive to said means for clamping for moving said frame in a direction to insert said trimming means into said tubular workpiece and to surround said tubular workpiece with said cutting edge, and means responsive to the position of said trimming means for moving said trimming means substantially perpendicular to the axis of rotation of said rotatable housing and toward said cutting edge to sever a workpiece remnant from the end portion by the cooperating action of said trimming means and said cutting edge.

14. Apparatus in accordance with claim 13, wherein said last means includes timer means for limiting the length of time that the trimming means is permitted to cooperate with said cutting edge, thereby completing the severing cycle.

References Cited

UNITED STATES PATENTS

| | | | |
|---|---|---|---|
| 1,605,924 | 11/1926 | Dodd | 72—71 X |
| 2,703,925 | 3/1955 | Peck | 72—370 X |
| 3,020,788 | 2/1962 | Peters | 72—203 |
| 2,125,269 | 8/1938 | Buff | 83—186 |
| 2,669,302 | 2/1954 | Brehm | 83—186 |
| 3,022,692 | 2/1962 | Polanski | 82—82 X |

FOREIGN PATENTS 749,389   5/1956   Great Britain.

RICHARD J. HERBST, *Primary Examiner.*

CHARLES W. LANHAM, *Examiner.*

E. SUTTON, *Assistant Examiner.*